June 13, 1967 L. E. HAAS 3,324,842
STARTING AND BRAKING MEANS FOR INTERNAL COMBUSTION ENGINES
Filed June 14, 1965 2 Sheets-Sheet 1

INVENTOR.
Lowell E. Haas
BY
Charles R. McKinley
ATTORNEY.

United States Patent Office 3,324,842
Patented June 13, 1967

3,324,842
STARTING AND BRAKING MEANS FOR
INTERNAL COMBUSTION ENGINES
Lowell E. Haas, Maquoketa, Iowa, assignor to Clinton Engines Corporation, Maquoketa, Iowa, a corporation of Michigan
Filed June 14, 1965, Ser. No. 463,568
9 Claims. (Cl. 123—185)

This invention relates to an improved braking system for internal combustion engines and more particularly to a combination spring starter and safety brake for engines of the type conventionally used on lawn mowers.

This invention provides an engine for a rotary power lawn mower or the like equipped with a spring actuated starter and an emergency braking system for stopping the engine and rotation of the cutter blade to prevent accidents, and provides a simple, reliable, and inexpensive engine control wherein the engine may be started or substantially instantaneously stopped by means of a single control. This control may be located adjacent to the lawn mower handle grips of a rotary mower, or in any convenient location accessible to the operator, depending on the type of equipment with which the invention is used. When for any reason the control is released or disengaged by the operator, the engine will stop almost instantaneously so as to avoid accidents due to rotation of the cutter blade.

Accordingly, a principal object of the invention is to provide an improved control for rotary lawn mower engines.

Another object of the invention is to provide an improved starter and brake system for an internal combustion engine.

A further object of the invention is to provide a novel starter and brake system for starting and substantially instantaneously stopping an internal combustion engine by means of a single control.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

Figure 1:
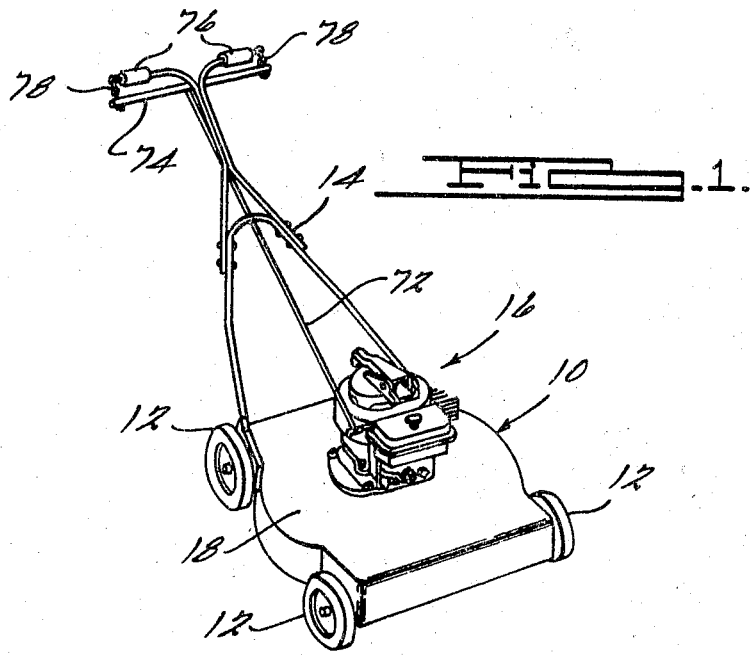
FIGURE 1 is a perspective view of a rotary lawn mower provided with a starter and brake system according to the invention.

As shown in the drawings, the lawn mower is provided with a sheet metal housing 10 to which are secured wheels 12 together with the handle structure 14. The internal combustion engine 16 is mounted on deck 18 of the housing 10. The engine has a vertical crankshaft 20 which carries a flywheel 22 at the upper end thereof and extends below deck 18. Cutter blade 24 is secured to the lower end of the crankshaft by means of a hub 26 and bolt 28. The hub is provided with a keyway 30 which cooperates with key 32 to insure that the hub and cutter blade rotate with the crankshaft. The engine has a crankcase 34 and a horizontal cylinder 36 which is surrounded by a sheet metal shroud 38.

The flywheel 22 is provided with an annular braking surface 40 and vanes 42 for cooling the engine during operation. A flexible brake band 44 extends around the flywheel braking surface 40 and consists of a spring steel backing strip 46 to which is secured a suitable braking material 48. A mounting post 50 is rotatably mounted within a socket in the engine cylinder 36 and is provided with a shoulder 52. A pin 54 on shoulder 52 secures the eyelet 56 at one end of the flexible brake band 44 to shoulder 52. Eyelet 58 at the other end of the brake band 44 is rotatably mounted on the mounting post 50.

Figure 2:
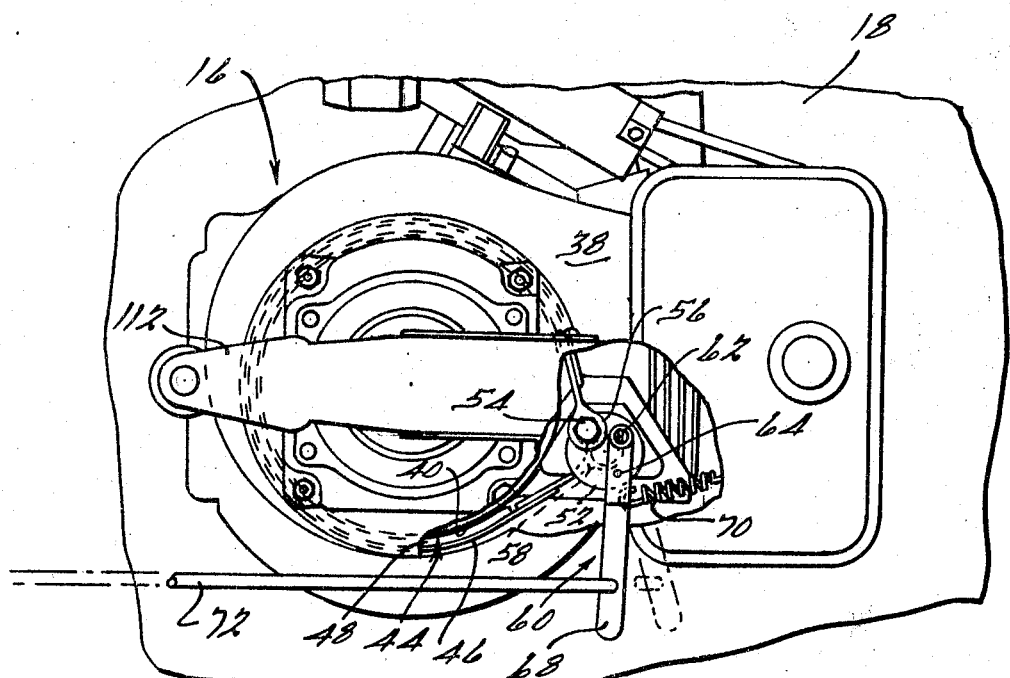
FIGURE 2 is a top plan view of the lawn mower engine, with parts broken away, showing a brake.
Figure 3:
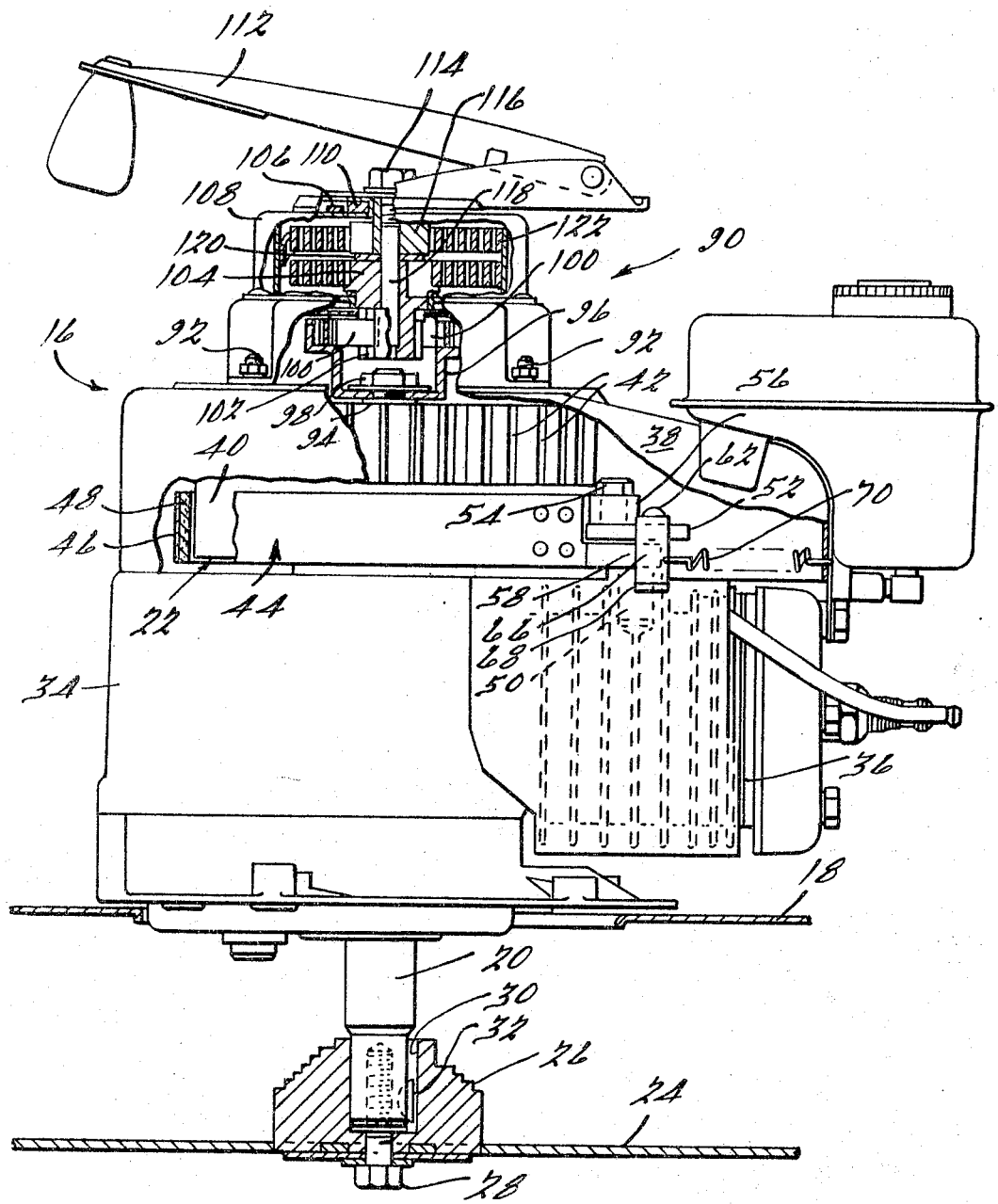
FIGURE 3 is a side elevational view of the lawn mower engine with parts broken away, showing a starter and brake according to the invention.

A control lever 60 is secured to the shoulder 52 by means of bolt 62 and pin 64 so that the mounting post and shoulder may be rotated by moving the lever back and forth between the positions shown in FIGURE 2. Spring 70 is hooked to the lever 60 at the vertical portion 66 thereof. The other end of the spring 70 is hooked to the shroud 38 so that the spring biases the control lever in a counterclockwise direction as viewed in FIGURE 2. The outwardly projecting portion 68 of the control lever is connected to control rod 72 which, as shown in FIGURE 1, extends up under the handle structure 14. The upper end of the control rod 72 is provided with a handle portion 74 the ends of which are secured to the lawn mower handles 76 by means of links 78 so that the lever 60 may be moved from the position shown in dotted line in FIGURE 2 to that shown in solid line by holding the handle portion 74 immediately adjacent to the lawn mower handles 76.

The lawn mower engine 16 is provided with a spring starter 90 mounted on the upper portion of shroud 38 by means of nuts and bolts 92. A starter cup 96 is secured on the upper end 94 of crankshaft 20 by means of bolt 98. Pawls 100 are pivotally secured to the cup 96 and are urged into engagement with splines 102 on lower starter shaft 104. Pawls 106 engage upper ratchet 110 which rotates with the starter winding handle 112. Bolt 114 is threadedly secured to upper starter shaft 116 and secures the starter handle thereto. A shaft 118 forms a common bearing for the starter shafts 104 and 116. A washer 120 serves as a spacer and bearing between the two shafts 104 and 116. A double wound coil spring 122 has one end engageable with the upper shaft 116 and the other end engageable with the lower shaft 104.

The lower ratchet comprising shaft 104, cup 96, and pawls 100 secures the lower shaft 104 against rotation while the spring 122 is wound by means of handle 112. The upper ratchet 110 secures the upper shaft 116 against rotation so that the spring can unwind and rotate the crankshaft to start the engine. During the winding of the spring the crankshaft and starter cup 96 are held against rotation by the brake band 44 which is held in engagement with the brake surface 40 of the flywheel by spring 70 which urges the shoulder 52 in a counterclockwise direction to the position shown in dotted lines in FIGURE 2.

After the starter is wound, the engine may be started by grasping the handle portion 74 of the control rod 72 so as to move the lever 60 to the position shown in solid lines in FIGURE 2, thus releasing the brake from the brake drum. The starter spring 122 will then rotate the crankshaft 20 and start the engine. The engine will continue to run as long as the handle 74 is gripped so as to hold the lever 60 against the force of spring 70. When for any reason the handle 74 is released, the spring 70 rotates the lever 60 in a counterclockwise direction to engage the brake band 44 with the brake surface 40 on the flywheel and substantially instantaneously stop the engine and cutting blade 24.

An advantage of the invention relates to the fact that it automatically stops the lawn mower engine when the handle is reelased, thus assuring that the lawn mower cannot be left operating when unattended. Also, the operator can stop the engine almost instantaneously so as to prevent an accident by releasing the handle 74. The engine is started by grasping the handle 74, which assures that the operator is away from the cutter blade 24 so as to reduce the likelihood of an accident occurring during the starting of the mower.

The drawings show the lever arm 60 controlled by rod 72 which is grasped by the lawn mower operator. However, the invention is not limited to rotary lawn mowers or to hand operated controls, and it is clear that the present invention could be used on lawn mowers and other equipment in which the deadman control is actuated by other means, such as a foot pedal or a driver's seat in the case of a riding mower. In any such arrangement the cocking lever 60 would be moved so as to disengage the brake band from the brake drum when the operator controlled means is properly manipulated so that the engine is automatically started at that time. The engine and the implement driven thereby would be instantaneously stopped when for any reason the deadman control is released.

The particular type of spring starter shown is for purposes of illustration only and the invention may be applied to engines having different types of starters. The brake mechanism in effect forms a part of the starter since it replaces the catch or release mechanism conventionally employed on spring starters for holding the starter cup and flywheel against rotation while the spring is being wound.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. In an internal combustion engine for a rotary lawn mower having a vertical crankshaft and a cutting blade secured on the lower end of the crankshaft for rotation therewith, the combination of a spring starter and a brake for the engine comprising a part rotatable with the crankshaft and engageable with a driven part of the spring starter to rotate the crankshaft and start the engine upon unwinding of the starter spring, a brake drum rotatable with the crankshaft and a brake band engageable with said brake drum, spring means urging said brake band into engagement with said brake drum to prevent unwinding of the starter spring and operation of said engine, control means engageable with said brake band and extending away from the engine to a position remote therefrom and operable to disengage said brake band from said brake drum to permit unwinding of the starter spring and starting of the engine, said control means being manually controlled at the remote end thereof by the operator and releasable to permit said spring means to engage said brake band with said brake drum to substantially instantaneously stop said engine and said cutting blade.

2. In an internal combustion engine for a rotary lawn mower having a vertical crankshaft and a cutting blade secured on the lower end of the crankshaft for rotation therewith, the combination of a spring starter and a brake for the engine, comprising a part secured to the crankshaft and engageable with a driven part of the spring starter to rotate the crankshaft and start the engine upon unwinding of the starter spring, a brake drum rotatable with the crankshaft and a brake band engageable with said brake drum, spring means urging said brake band into engagement with said brake drum to prevent unwinding of the starter spring and operation of said engine, control means for said brake band to disengage the latter from said brake drum to permit unwinding of the starter spring and starting of the engine, said control means being manually controlled by the operator and releasable to permit said spring means to engage said brake band with said brake drum to substantially instantaneously stop said engine and said cutting blade.

3. In an internal combustion engine having a crankshaft and a driven element secured to the crankshaft for rotation therewith, the combination of a spring starter and a brake for the engine comprising a part secured to the crankshaft and engageable with a driven part of the spring starter to rotate the crankshaft and start the engine upon unwinding of the starter spring, a brake member rotatable with the crankshaft and a brake element engageable with said brake member, spring means urging said brake element into engagement with said brake member to prevent unwinding of the starter spring and operation of said engine, and control means for said brake element to disengage the latter from said brake member to permit unwinding of the starter spring and starting of the engine, said control means being releasable to permit said spring means to engage said brake element with said brake member to substantially instantaneously stop said engine and said driven element.

4. In an internal combustion engine for a rotary lawn mower having a vertical crankshaft and a cutting blade secured to the lower end of the crankshaft for rotation therewith, an engine control for starting and stopping the engine comprising a starter secured to the engine including a starter spring and a driven part connectible with the upper end of said crankshaft so as to rotate said crankshaft and start the engine when the starter spring unwinds, a brake drum rotatable with said crankshaft, a brake band engageable with said brake drum, a brake spring biasing said brake band toward said brake drum for engagement with the same so as to stop rotation of the crankshaft substantially instantaneously and to hold said crankshaft against rotation during winding of the starter spring, and means engaging said brake band and selectively operable to move said brake band away from said brake drum against the action of the brake spring to permit unwinding of the starter spring to rotate the crankshaft and start the engine.

5. In an internal combustion engine having a crankshaft and a driven element secured to the crankshaft for rotation therewith, an engine control for starting and stopping the engine comprising a starter including a starter spring and a driven part engageable with said crankshaft so as to rotate said crankshaft and start the engine when the starter spring unwinds, a brake surface rotatable with said crankshaft, a brake element engageable with said brake surface, means biasing said brake element toward said brake surface for engagement with the same so as to stop rotation of the crankshaft substantially instantaneously and to hold said crankshaft against rotation during winding of the starter spring, and means engaging said brake element and selectively operable to move said brake element away from said brake surface against the action of said biasing means to permit unwinding of the starter spring to rotate the crankshaft and start the engine.

6. A starting and braking device for an internal combustion engine for a rotary lawn mower having a vertical crankshaft comprising a starter mounted on the engine and connectible with the upper end of said crankshaft so as to rotate said crankshaft and start the engine and a cutting blade secured to the lower end of the crankshaft for rotation therewith, a brake drum rotatable with said crankshaft, a brake band engageable with said brake drum, a spring biasing said brake band toward said drum for engagement with the same so as to stop rotation of the crankshaft substantially instantaneously and to hold said crankshaft against rotation during winding of the starter, and operator controlled means engaging said brake band and selectively operable to move said brake band away from said brake drum against the action of the spring to permit the starter to rotate the crankshaft and start the engine.

7. A starting and braking device for an internal combustion engine having a crankshaft comprising a starter connectible with the crankshaft so as to rotate said crankshaft and start the engine and a driven part secured to the crankshaft for rotation therewith, a brake surface rotatable with said crankshaft, a brake element engageable with said brake surface, means biasing said brake element toward said brake surface for engagement with the same so as to stop rotation of the crankshaft substantially instantaneously and to hold said crankshaft against rotation during energization of the starter, and means engaging said brake element and selectively operable to move said brake element away from said brake surface against the action of said biasing means to permit the starter to rotate the crankshaft and start the engine.

8. In an internal combustion engine for a lawn mower or the like having a crankshaft and a driven element secured to the crankshaft for rotation therewith, the combination of a spring starter and a brake for the engine comprising a part secured to the crankshaft and engageable with a driven part of the spring starter to rotate the crankshaft and start the engine upon unwinding of the starter spring, a brake member rotatable with the crankshaft and a brake element engageable with said brake member, spring means urging said brake element into engagement with said brake member to prevent unwinding of the starter spring and operation of said engine, and control means connected to said brake element and extending therefrom to a point accessible to the operator during normal operation of the engine and manually manipulatable to a position to disengage said brake element from said brake member to permit unwinding of the starter spring and starting of the engine and normal operation of the engine as long as said control means is held in said position by the operator, said spring means being operable to effect substantially instantaneous engagement of said brake element with said brake member to stop said engine and driven element upon release of said control means by the operator.

9. In an internal combustion engine for a lawn mower or the like having a crankshaft and a driven element secured to the crankshaft for rotation therewith, a brake member rotatable with the crankshaft and a brake element engageable with said brake member, spring means urging said brake element into engagement with said brake member to prevent rotation of said crankshaft, and control means connected to said brake element and extending therefrom to a point accessible to the operator during normal operation of the engine and manually manipulatable to a position to disengage said brake element from said brake member to permit rotation of said crankshaft and normal operation of the engine as long as said control means is held in said position by the operator, said spring means being operable to effect substantially instantaneous engagement of said brake element with said brake member to stop said engine and driven element upon release of said control means by the operator.

References Cited

UNITED STATES PATENTS

| | | | |
|---|---|---|---|
| 1,457,946 | 6/1923 | Sommers | 123—185 |
| 3,150,653 | 9/1964 | Barr | 123—179 |

MARK NEWMAN, *Primary Examiner.*

RALPH D. BLAKESLEE, *Examiner.*